(12) United States Patent
Walrath

(10) Patent No.: US 9,269,122 B2
(45) Date of Patent: Feb. 23, 2016

(54) FIRST AND SECOND SOFTWARE STACKS AND DISCRETE AND INTEGRATED GRAPHICS PROCESSING UNITS

(75) Inventor: Craig A. Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/878,691

(22) PCT Filed: Oct. 11, 2010

(86) PCT No.: PCT/US2010/052206
§ 371 (c)(1),
(2), (4) Date: Apr. 10, 2013

(87) PCT Pub. No.: WO2012/050560
PCT Pub. Date: Apr. 19, 2012

(65) Prior Publication Data
US 2013/0207984 A1  Aug. 15, 2013

(51) Int. Cl.
*G06F 15/16* (2006.01)
*G06F 15/00* (2006.01)
*G06T 1/00* (2006.01)
*G06T 1/20* (2006.01)
*G06F 9/455* (2006.01)

(52) U.S. Cl.
CPC .............. *G06T 1/20* (2013.01); *G06F 9/45533* (2013.01); *G09G 2360/06* (2013.01)

(58) Field of Classification Search
CPC ....... G06T 1/00–1/0092; G06T 15/00–15/005; G06T 1/20; G06F 15/00; G06F 15/16–15/161; G06F 15/80–15/8092; G09G 5/363; G09G 5/393; G09G 2360/06

USPC .................................. 345/501, 502, 505, 522
See application file for complete search history.

(56) References Cited

U.S. PATENT DOCUMENTS

| | | | |
|---|---|---|---|
| 7,868,897 B2 * | 1/2011 | Vembu et al. ................. | 345/531 |
| 8,717,372 B1 * | 5/2014 | Wyatt ............................. | 345/502 |
| 2003/0009748 A1 | 1/2003 | Glanville et al. | |
| 2004/0183806 A1 * | 9/2004 | Marion et al. ................ | 345/542 |
| 2006/0282604 A1 * | 12/2006 | Temkine et al. .............. | 710/314 |
| 2007/0130559 A1 | 6/2007 | Torunoglu et al. | |
| 2010/0013839 A1 | 1/2010 | Rawson | |
| 2010/0118041 A1 | 5/2010 | Chen et al. | |
| 2010/0245366 A1 * | 9/2010 | Nath ............................. | 345/502 |
| 2011/0057937 A1 * | 3/2011 | Wu et al. ...................... | 345/505 |
| 2012/0050259 A1 * | 3/2012 | Solomonov et al. .......... | 345/419 |

OTHER PUBLICATIONS

Galus, et al; "Hybrid Multi-monitor Support: Enabling new usage models for Intel® Embedded Platforms", < http://download.intel.com/design/intarch/papers/323214.pdf>, Jan. 2010.
International Searching Authority, International Search Report and Written Opinion, Appln No. PCT/US2010/052206, date of mailing Jun. 23, 2011, 9 p.

* cited by examiner

*Primary Examiner* — Jacinta M Crawford
(74) *Attorney, Agent, or Firm* — Hewlett-Packard Patent Dept.

(57) ABSTRACT

A first software stack and a second software stack are run in a virtual environment. The virtual environment may be created by a hardware virtualizer. The hardware virtualizer may send the first software stack to the discrete graphics processing unit and the second software stack to the integrated graphics processing unit.

15 Claims, 6 Drawing Sheets

FIRST AND SECOND SOFTWARE STACKS AND DISCRETE AND INTEGRATED GRAPHICS PROCESSING UNITS

BACKGROUND

A computing system can have a graphical processor to process instructions related to images to be displayed on a display. A computing system may have a graphics processing unit integrated into the chipset of a computing system. A computing system may have a discrete graphics processing unit that is coupled to a chipset of a computer system.

BRIEF DESCRIPTION OF THE DRAWINGS

Some embodiments of the invention are described with respect o the following figures.

DETAILED DESCRIPTION

A computing system may include an integrated graphics processing unit. An integrated graphics processing unit is integrated in the package or die of another component, for example the integrated graphic processing unit may be part of a controller hub or may be integrated in a package or die with a processor. A package can be a housing for an electronic circuit and a die may be a semiconductor such as silicon containing electronic circuits. The processor may be for example a general purpose processor that can process data from a variety of software. The controller hub maybe for example a general controller hub that may include for example a graphic memory controller hub that provides a connection to a processor, memory, firmware, graphics processing unit and may also include other controller hubs such as the input output controller hub. A discrete graphics processing unit can be a component not integrated as part of another component such as the controller hub or processor.

A computing system can include an integrated graphics processing unit as part of a controller hub or as part of the processor and can also contain a discrete graphics processing unit. In a system with both a discrete graphics processor and an integrated graphics processor, the computing system may utilize a discrete graphics processing unit, an integrated graphics processing unit or may utilize both graphics processing units. For example the computing system may allow a user to select which graphics processing unit is operational. The integrated graphics processing unit may for example use less power than the discrete graphics processing unit so that the system saves power. The system may also utilize both graphics units simultaneously to drive separate display outputs for example.

A hardware virtualizer such as a hypervisor creates virtual images of hardware. A software stack such as a virtual machine or virtual appliance can use the virtual image of the hardware. The hardware virtualizer communicates the operations of the virtual image of the hardware to the physical hardware for processing. If there is more than one software stack, each of the software stacks can provide data to a virtual graphics processing unit that is part of the hardware virtualizer. The hardware virtualizer can then process the data on an integrated graphics processing unit or a discrete graphics processing unit.

In one embodiment, a system can include an integrated graphics processing unit and a discrete graphics processing unit. The hardware virtualizer can send data from the first software stack to the integrated graphics processing unit and a second software stack to discrete graphics processing unit.

Figure 1:
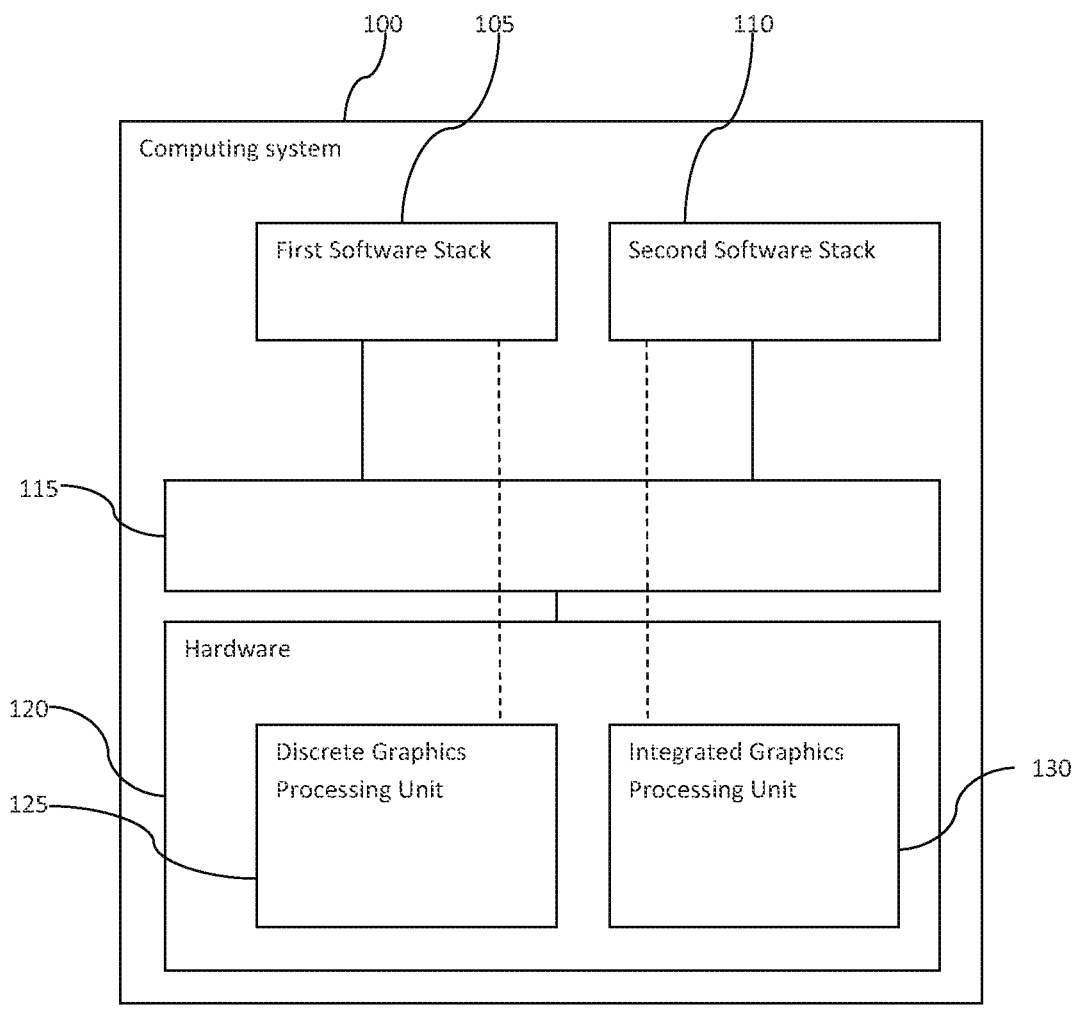
FIG. 1 is a block diagram of a virtual computing system according to an example embodiment.

With reference to the figures, FIG. 1 is a block diagram of a virtual computing system according to an example embodiment. The computing system 100 includes hardware 120. The hardware 120 can be components of the computing system for example a processor, controller hub, hard disk drive, or input output devices among other components. The hardware 120 can also include a discrete graphics processing unit 125 and an integrated graphics processing unit 130.

The integrated graphics processing unit 130 maybe for example part of another component such as the controller hub or processor of the computing system 100. The integrated graphics processing unit can communicate with at least one of the processor, memory, input output devices, and discrete graphics processing units 125.

The discrete graphics processing unit 125 and the integrated graphics processing unit 130 may have different processing capabilities. For example the discrete graphics processing unit 125 may run at a higher clock speed or have more processing cores than an integrated graphics processing unit 130. The discrete graphics processing unit 125 may also have dedicated memory for example that is used by the discrete graphics processing unit 120 and the integrated graphics processing unit 130 may use the system random access memory that may be used by the system processor.

The hardware virtualizer 115 can be hardware, software or both hardware and software that generates virtual simulations of hardware components for use by a software stack. The first software stack 105 and the second software stack 110 can run on the virtual hardware images created by the hardware virtualizer 115.

The hardware virtualizer 115 can use either the discrete graphics processing unit 125 or the integrated graphics processing unit 130 to, for example, execute code, process data, transfer data or other functions associated with the first software stack or the second software stack. The hardware virtualizer 115 may make a determination on whether the discrete graphics processing unit 125 or the integrated graphics processing unit 130 is used by the first software stack 105 or the second software stack 110. The determination may be based at least in part on graphics processing usage such as the amount of instructions to execute or data to process from the first software stack 105 or from the second software stack 110 as well as the capabilities of the discrete graphics processing unit 125 and the integrated graphics processing unit 130. For example a software stack may be a virtual machine running an operating system such as Windows®, Linux, Unix or another operating system. The hardware virtualizer 115 may determine that the first software stack may use more graphics processing capabilities than the second software stack and utilizes either the discrete graphics processing unit 125 or the integrated graphics processing unit 130 depending on the capabilities of the discrete graphics processing unit 125 and the integrated graphics processing unit 130 for the first software stack. For example if the discrete graphics processing unit 125 can process data faster than the integrated graphics processing unit 130 the hardware virtualizer 115 may use the discrete graphics processing unit 125 for the first software stack 105 if the first software stack 105 can use more graphic processing capabilities than the second software stack 110.

The hardware virtualizer 115 may determine which of the graphics processing units is used by a software stack at the initialization of a new software stack, the discontinuation of a software stack or the change in amount of use of a software stack. For example the determination may be preconfigured, user configured, or dynamically switch the graphics processing units between the software stacks. If the hardware virtualizer 115 determines which of the graphics processing units a software stack uses at an initialization of a new software stack the hardware virtualizer may use stored criteria for making this determination, for example, the hardware virtualizer 115 may use data related to a prior execution of a software stack. If the hardware virtualizer 115 is preconfigured to use either the discrete graphics processing unit 125 or the integrated graphics processing unit 130 with a software stack this may be determined in the programming of the hardware virtualizer 115. The hardware virtualizer 115 may be user configured such as providing a user with a graphical user interface allowing the user to select which of the software stacks is processed by one of the discrete graphics processing unit 125 any integrated graphics processing unit 130. The user may be able to select for example that the first software stack such as Windows® compatible software, may use the discrete graphics processing unit 125 and that the second software stack 110 containing, for example Linux compatible software may use the integrated graphics processing unit 130. In a dynamic environment the hardware virtualizer 115 can monitor the first software stack 105 and the second software stack 110 and switch the software stacks between the discrete graphics processing unit 125 and the integrated graphics processing unit 130 according to which software stack can more efficiently use the capabilities of the discrete graphics processing unit 125 and the integrated graphics processing unit 130. The efficient use of the capabilities of a graphic processing unit can be based on for example the type of instruction, the amount of instructions, the amount of data, and the speed of a graphics processing unit among other considerations.

In one embodiment there may be more than one discrete graphics processing unit 125 or more than one integrated graphic processing unit 130. There may be a discrete graphics processing unit 125 or an integrated graphic processing unit 130 that includes more than one graphics processing cores in a package or on a die. A graphics processing core can be the portion of the graphics processing unit that executes instructions, processes data or both. If there are more than one processing cores, either multiple discrete graphic processing units 125, multiple integrated graphics processing units 130, multiple processing cores within the discrete graphics processing unit 125 or multiple processing cores within the integrated graphics processing unit 130 then each software stack can use a processing core or may use multiple processing cores. For example if there are three software stacks and there are 4 discrete graphic processing cores and 1 integrated graphic processing core for a total of 5 graphics processing cores each of the software stacks may use one core, one or two of the software stacks may use 2 cores while the third uses one core, or two software stacks may use one core and the third software stack may use 3 cores. If there are more software stacks than there are graphics processing cores a software stack may have to wait for another software stack to finish using a graphic processing core or the hypervisor can evict one of the software stacks to free up a graphic processing core.

To secure a software stack from a malicious attack initiated from another software stack each of the software stacks may use different graphic processing units or different graphics processing cores within the graphic processing unit. A malicious attack may be an attack that access images from another software stack. For example images from one software stack that includes a bank account number may be accessed by malicious software on another software stack if the software stacks have access to each of the graphics processing units. At least one of the hardware and software can provide a protection mechanism so that a software stack is not able to inappropriately access the graphics processing or memory of another software stack. The inappropriate access may be any access of the graphics processing or memory of another software stack, access restricted by time of access, access restricted by content of access or another access restriction to the graphic processing or memory of the software stack. The protection mechanism may for example prevent access to data at a memory location such as data stored in a range of memory addresses.

Figure 2:
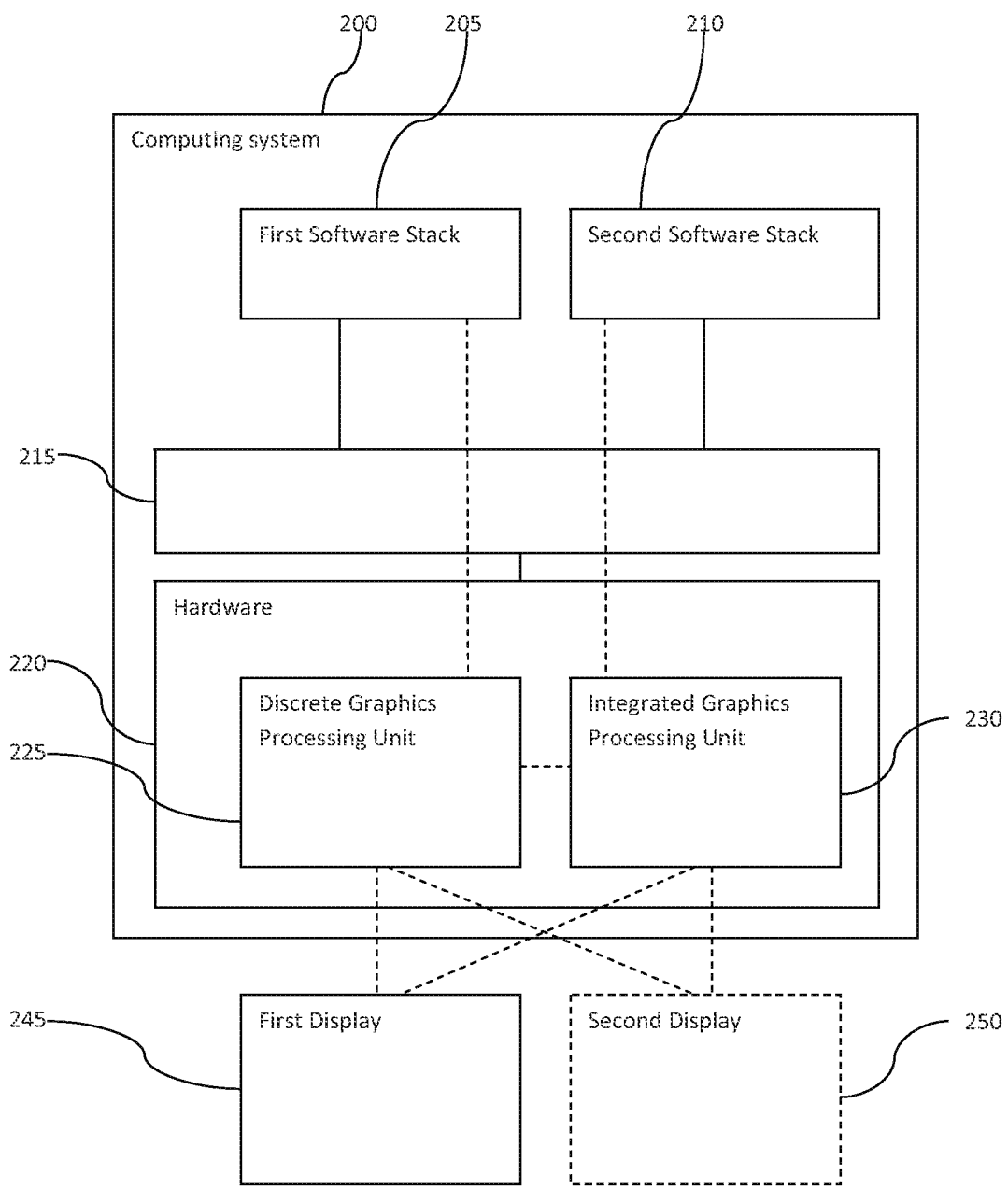
FIG. 2 is a block diagram of a virtual computing system according to an example embodiment.

FIG. 2 is a block diagram of a virtual computing system according to an example embodiment. The computer system 200 includes hardware 220. A hardware virtualizer 215 can use the hardware 220 to execute a software stack. A first software stack 205 can execute on a hardware image generated by the hardware virtualizer 215. A second software stack 210 can execute on a hardware image generated by the hardware virtualizer 215.

The hardware 220 can include a discrete graphics processing unit 225 and an integrated graphics processing unit 230. The hardware 220 may be connected to a first display 245. The hardware 220 may also be connected to a second display 250. The display may be for example a liquid crystal display (LCD), plasma, light emitting diode (LED), digital light processor (DLP), cathode ray tube (CRT) or another technology.

The first display 245 may be connected to the discrete graphics processing unit 225. The first display 245 may display images from the discrete graphics processing unit 225 or the integrated graphics processing unit 230. The images on the first display can be from the first software stack 205 or the second software stack 210. The hardware virtualizer 215 can determine whether the first software stack 205 or the second software stack 210 supplies the image data to the discrete graphics processing unit 225 or to the integrated graphics processing unit 230.

The hardware virtualizer 215 can provide to the hardware 220 an indication that allows the hardware to display the images on the first display 245 or the second display 250. For example the first display 245 may display images from the discrete graphics processing unit 225 and a second display 250 may display images from the integrated graphics processing unit 230. In another example the first display 245 may display an image from the discrete graphics processing unit 215 and an image from the integrated graphics processing unit 230. If the first display 245 is displaying images from the discrete graphics processing unit 225 and the integrated graphics processing unit 230 then the images from the discrete graphics processing unit 225 may be in a first area on the first display 245 and the images from the integrated graphics processing unit 230 can be displayed in a second area. The areas displaying the images on the first display may be a window. The size of the window may be determined by the hardware virtualizer 215 for example the hardware virtualizer may determine the size of the window from the resolution of the image from the software stack.

In one embodiment, the size of the windows showing the image from first software stack 205 or the second software stack 210 may be adjusted by the user. For example if a first window includes an image from the first software stack 205 the side, top or bottom of the window could be moved to adjust the size of the window. In one embodiment the first display 245 has a set resolution and the size of the images are determined by the resolution output from the discrete graphics processing unit 225 or the integrated graphics processing unit 230. The resolution output can be determined by the hardware 220, hardware virtualizer 215, the first software stack 205, the second software stack or a combination of these. If the resolution output by the hardware 220 of the images from the first software stack 205 is lower than the resolution of the first display 245 then the image on the first display 245 may be smaller than the entire display. For example if the resolution of the first display 245 is 1600 pixels by 1200 pixels and the resolution received from the hardware is 1024 pixels by 768 pixels then the image may not be expanded to the entire screen automatically if display is receiving images from both the first software stack 205 and the second software stack 210.

Coordination between the images from the first software stack 205 and the second software stack 210 can occur at one or more than one level in the system. For example the coordination may occur at the stack level, the hardware virtualizer level, or the hardware level. At the hardware level the coordination may be between the discrete graphics processing unit 225 and the integrated graphics processing unit 230. The coordination allows images from the first or the second software stacks to be display on a display or multiple displays without interfering with images of the other software stack.

The output of the computing system 200 can be from the integrated graphic processing unit 230, the discrete graphics processing unit 225 or both as shown by the dotted connections between the first display 245 and the discrete graphics processing unit 225 or the integrated graphic processing unit 230 and also between a second display 250 either the graphics processing unit the first display is connected to or another graphics processing unit. In one embodiment either the integrated graphic processing unit 230 or the discrete graphics processing unit 225 outputs to a display or multiple displays and the graphics processing unit without an output to the displays coordinates with the graphics processing unit with the output for displaying the images from a software stack using the graphics processing unit without an output to a display connected.

In one embodiment coordination between the discrete graphic processing unit 225 and the integrated graphics processing unit 230 can allow an image from the first software stack 205 to be on the first display 245, the second display 250 or both the first display 245 and the second display 250. The coordination between the discrete graphic processing unit 225 and the integrated graphics processing unit 230 can allow an image from the second software stack 210 to be on the first display 245, the second display 250 or both the first display 245 and the second display 250, An image from the first software stack and an image from the second software stack can be displayed on the first display, the second display, can be tiled, cascaded, overlapped, sized, moved or manipulated in another way if the discrete graphics processing unit 225 and the integrated graphics processing unit 230 coordinate. The coordination between the discrete graphic processing unit 225 and the integrated graphic processing unit 230 may be initiated by the hardware virtualizer 215.

Figure 3:
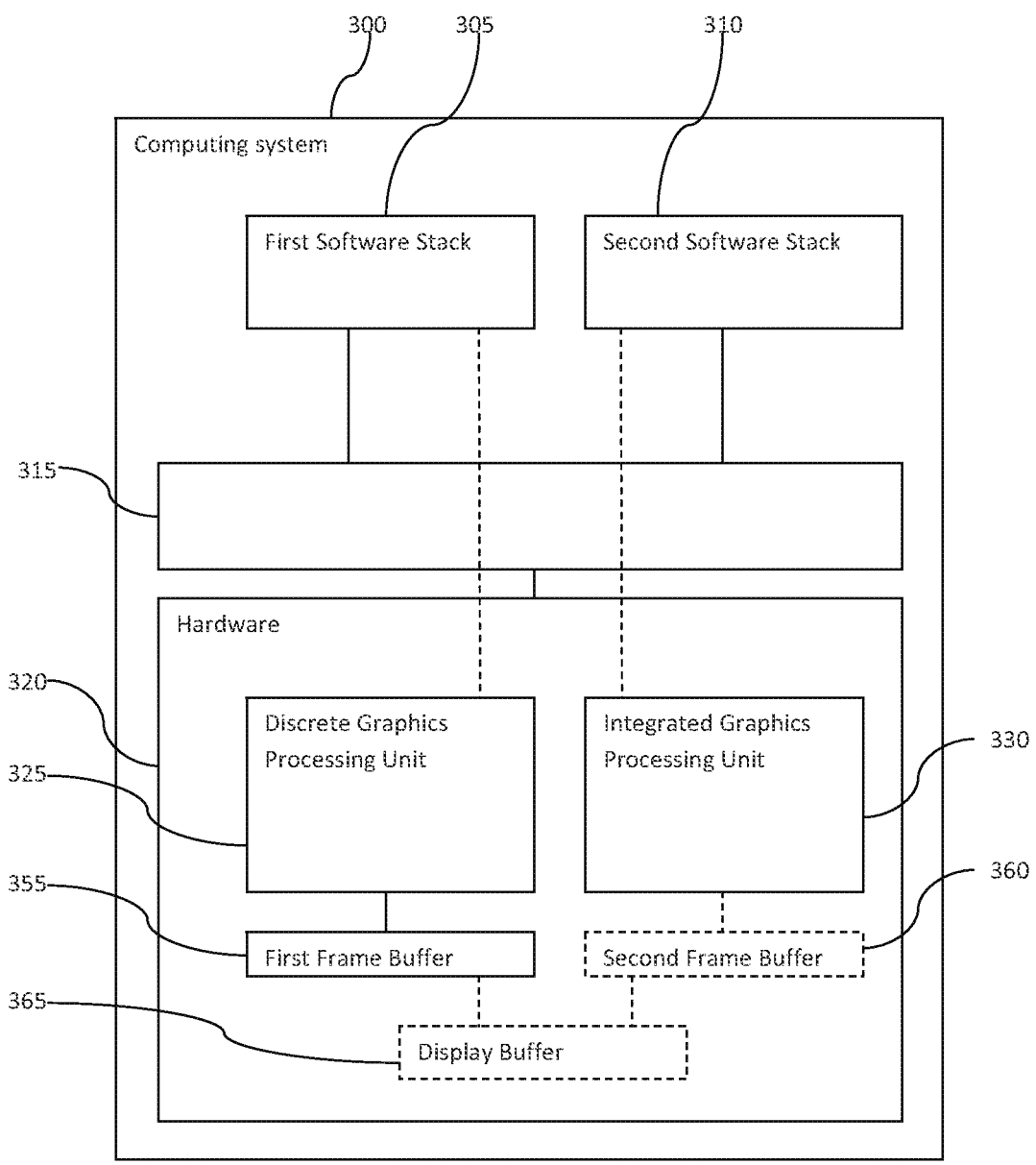
FIG. 3 is a block diagram of a virtual computing system according to an example embodiment.

FIG. 3 is a block diagram of a virtual computing system according to an example embodiment. The computing system 300 can include a first software stack 305 and a second software stack 310 running on a hardware virtualizer 315. The hardware virtualizer 315 can generate virtual hardware to be used by the first software stack 305 and the second software stack 310. The hardware virtualizer uses the hardware 320 which includes a discrete graphics processing unit 325 and an integrated graphics processing unit 330 to run the first software stack 305 and the second software stack 310.

The discrete graphics processing unit 355 can connect to a first frame buffer 355. The first frame buffer 355 receives the image data from the discrete graphics processing unit 325. The image data can be for example frames stored in the frame buffer that are going to be displayed by a display. A frame may be for example data representing every pixel in an image that is going to be displayed. In one embodiment the discrete graphics processing unit 325 and the integrated graphics processing unit can share the first frame buffer 355.

A second frame buffer may be connected to the integrated graphics processing unit. A discrete graphics processing unit 325 may be connected to the first frame buffer 355 and the integrated graphics processing unit 360 may be connected to a second frame buffer 360. If the discrete graphics processing unit 325 and the integrated graphics processing unit 330 have access to the each other's frame buffers the data from one software stack may be unsecure. For example if the first software stack 305 were generating data that was processed by the discrete graphics processing unit 325 and the first frame buffer 355 storing the image data was accessible by the integrated graphics processing unit 330 then the second software stack 310 may have access to the data generated by the first software stack 305. If the second software stack 310 has access to images generated by the first software stack 305 malicious software may be able to access an image, for example if the first software stack was generating an image of bank account numbers and a malicious software on the second software stack 310 had access to the data in the first frame buffer 355 the second software stack 310 could have access to the images of the bank account numbers. In one embodiment the first software stack 305 or the second software stack 310 may not have access to a frame buffer if another software stack is actively storing data in the frame buffer.

In one embodiment the first frame buffer 355 and the second frame buffer 360 are connected to a display buffer 365. For example a display buffer 365 may be used to connect the hardware 320 to a display. The image data in the display buffer 365 may be rendered on the display and may include image data from the first display buffer 355 and the second display buffer 360. If the first software stack 305 and the second software stack 310 do not have access to read data from the display buffer the images are secure from being retrieved by the another software stack. In one embodiment the first software stack 305 can access a portion of the display buffer for example the first software stack 305 may have access to a set of lower addresses of the display buffer 365 and not to the higher addresses. The second software stack 310 may have access to a different portion of the display buffer than the first software stack 305, for example the second software stack 310 may have access to a set up higher addresses of the display buffer 365 and not the lower addresses. Preventing the first software stack from accessing the portion of the display buffer used by the second software stack and the second software stack from accessing the portion of the display buffer 365 used by the first software stack secures the images in the display buffer from the first software stack from malicious code on a second software stack and secures the images in the display buffer from the second software stack from malicious code on a first software stack.

Figure 4:
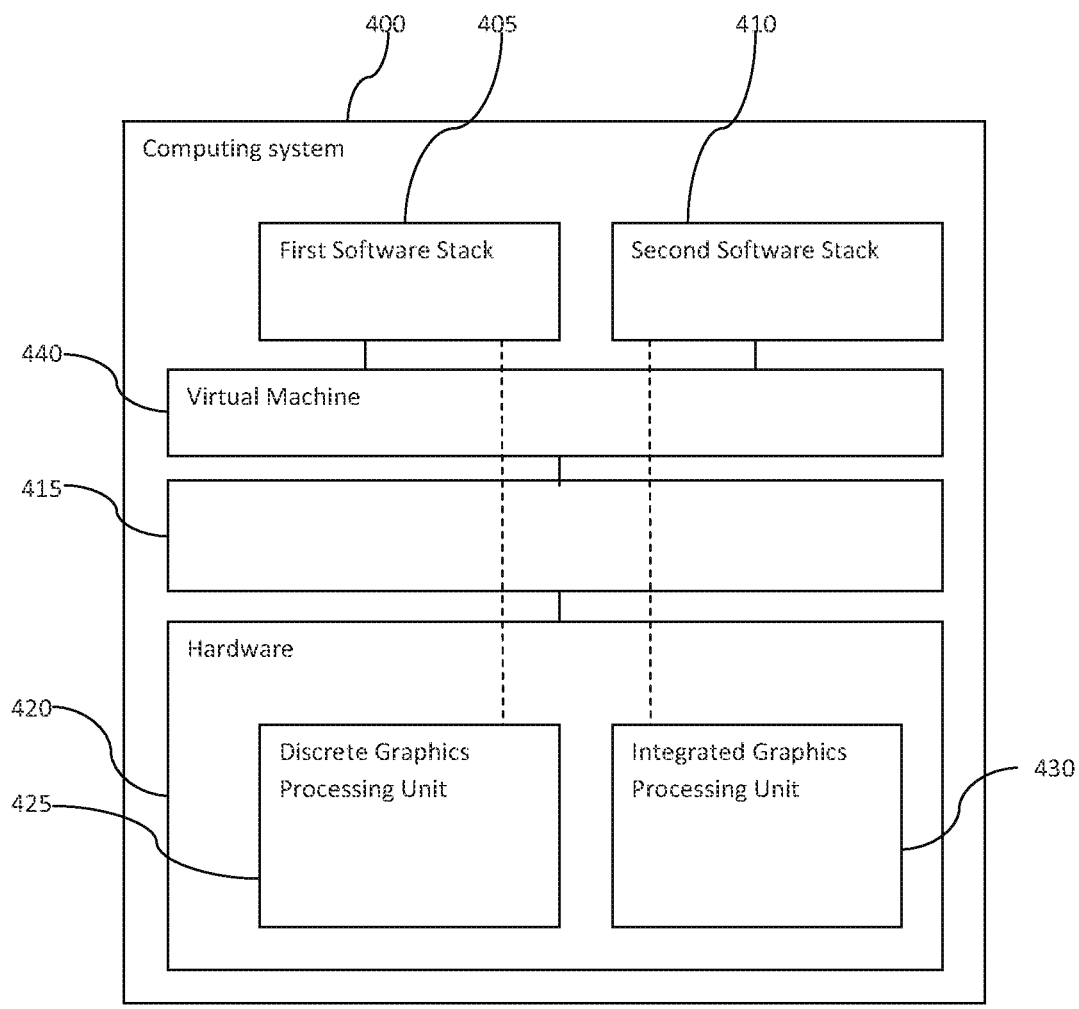
FIG. 4 is a block diagram of a virtual computing system according to an example embodiment.

FIG. 4 is a block diagram of a virtual computing system according to an example embodiment. The computing system 400 can include a first software stack 405 and a second software stack 410. The first software stack 405 and the second software stack 410 can run on a virtual machine 440. The virtual machine 440 can be an operating system, for example Windows®. The first software stack 405 and the second software stack may be applications. The applications may be for example a word processor, spreadsheet, database, image processor, media player or another application.

A hardware virtualizer 415 can generate virtual images of hardware. The hardware virtualizer can use the hardware 420 of the computing system 400. The hardware 420 can include a discrete graphics processing unit 425 and an integrated graphics processing unit 430. The discrete graphics processing unit 425 can receive image data from the first software stack 405 and the integrated graphics processing unit can receive image data from the second software stack 410.

Figure 5:
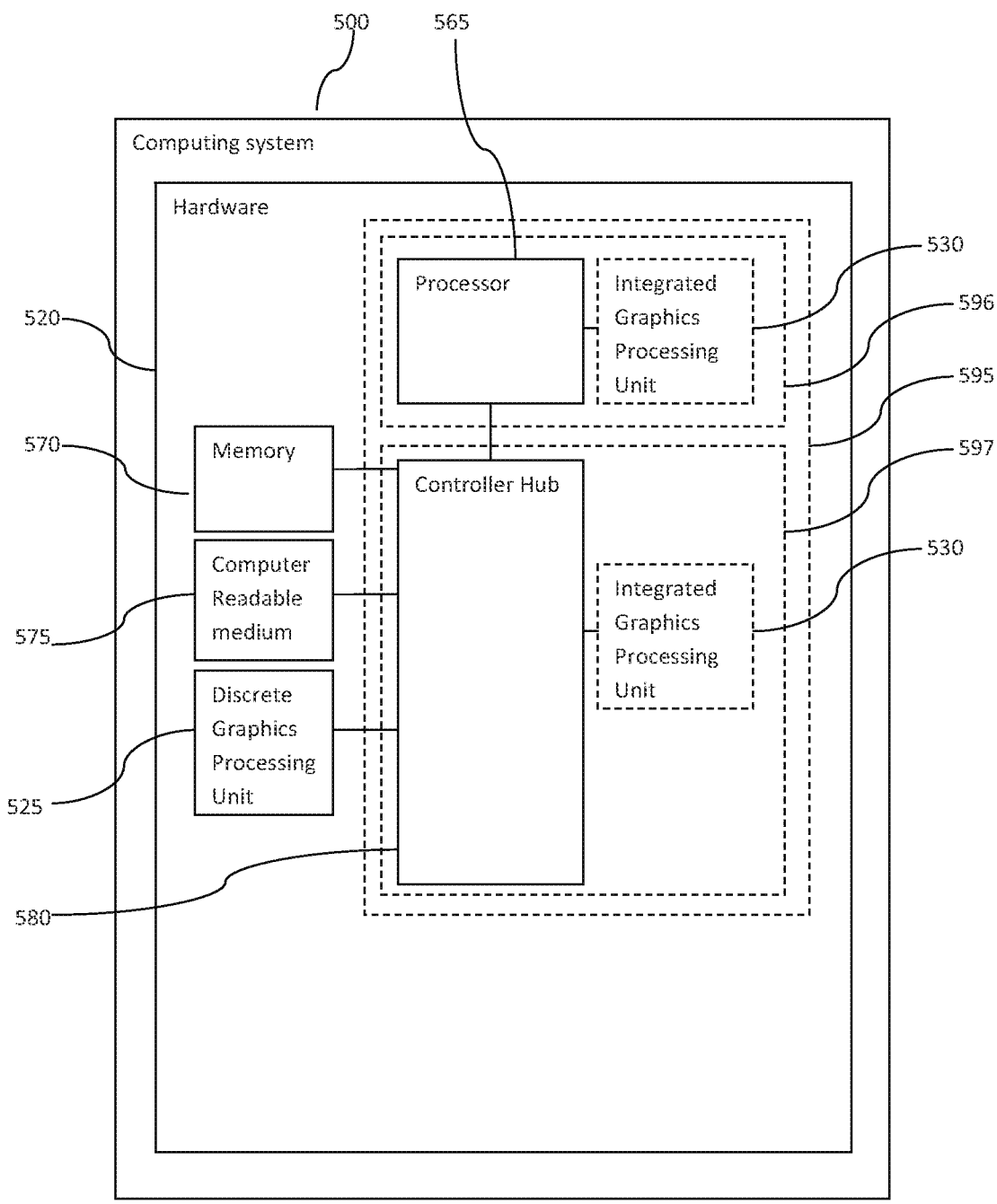
FIG. 5 is a block diagram of a computing system according to an example embodiment.

FIG. 5 is a block diagram of a computing system according to an example embodiment. The computing system 500 includes hardware 520. The hardware can include a processor 565 connected to a controller hub 580. The components such as the processor 565, the controller hub 580 and the integrated graphics processing unit 530 may be in different configurations within single or multiple packages or dies. The processor 565, controller hub 580, and integrated graphics processing unit 530 may be in a package or die 595. The processor 565 and integrated graphic processing unit 531 may be in a package or die 596. The controller hub and integrated graphic processing unit may be in a package or die 597. An integrated graphics processing unit 530 may be in a package or die 596 with the processor 565 and may be also be in a package or die 597 with the controller hub 580. The controller hub 580 may be separated into a north bridge and a south bridge. The controller hub 580 may include an integrated graphics processing unit 530. The controller hub 580 may by connected to a discrete graphics processing unit 525. If the controller hub 580 is separated into a north bridge and a south bridge the discrete graphics processing unit 525 may be connected to either the north bridge or the south bridge.

The controller hub 580 may also be connected to memory 570. The memory 570 may be for example a volatile storage such as random access memory or may be a non-volatile memory such as Flash memory, read only memory, programmable read only memory, a hard disk drive or another memory. The controller hub 580 can also be connected to a computer readable medium 575.

Figure 6:
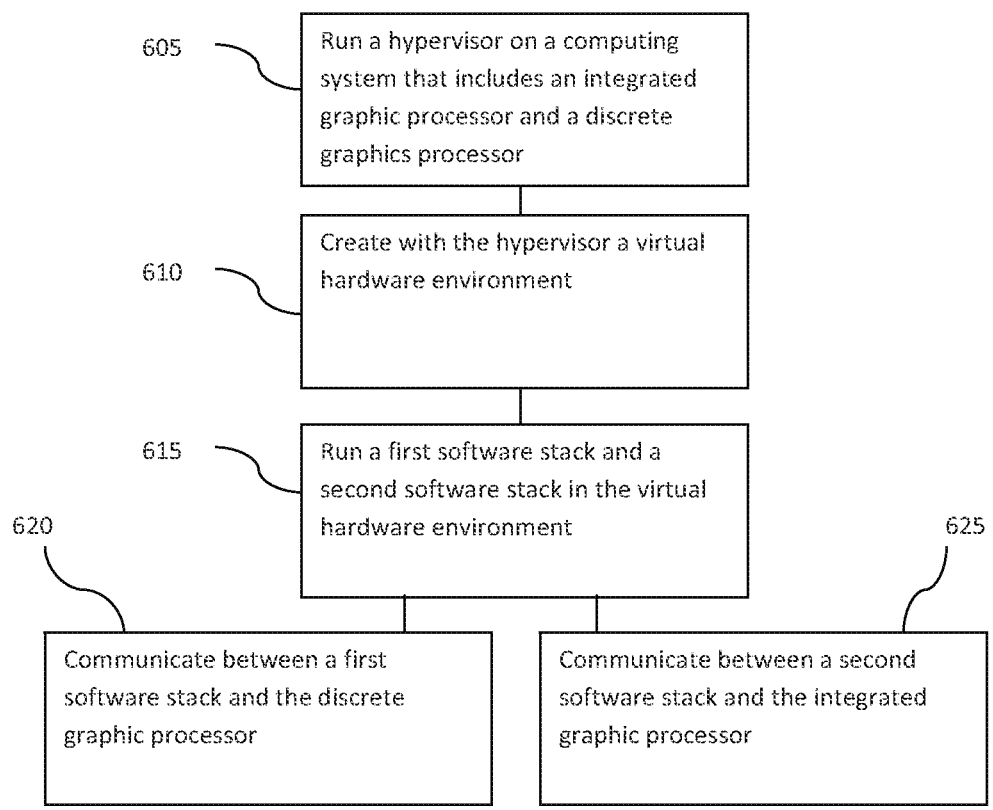
FIG. 6 is flow diagram of a method according to an example embodiment of the invention.

FIG. 6 is flow diagram of a method according to an example embodiment of the invention. The method includes a hardware virtualizer that is running on a computing system at 605. The computing system can include an integrated graphics processing unit and a discrete graphics processing unit. A virtual environment can be created by a hardware virtualizer at 610. The virtual environment can include virtual images of hardware.

A first software stack and a second software stack can run on the virtual hardware of the virtual hardware environment at 615. The software stack can be for example a virtual machine such as an operating system. The discrete graphics processing unit can communicate with the first software stack at 620. The integrated graphics processing unit can communicate with the second software stack at 625. The communication may include at least one of the execution of code, processing of data or another function of the graphics processing unit.

The graphics processing usage for the first software stack and the second software stack can be determined for example by the hardware virtualizer or another component. In one embodiment the first software stack can be prevented from communicating with the integrated graphics processing unit, the second software stack can be prevented from communicating with the discrete graphic processing unit or both.

The techniques described may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory; EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom, including but not limited to combining any portion of the example embodiments. It is intended that the appended claims cover such modifications and variations as fall within the true spirit and scope of the invention.

What is claimed is:

1. A computing system comprising:
  an integrated graphics processing unit;
  a discrete graphics processing unit having greater processing capabilities as compared to the integrated graphics processing unit; and
  a hardware virtualizer to:
    generate a virtual image of hardware comprised in the computing system;
    provide the virtual image to a plurality of software stacks for utilization;
    receive, from each of the plurality of software stacks, data comprising operations performed on the virtual image;
    based on the operations performed on the virtual image by each of the plurality of software stacks, determine a graphics processing usage for each of the plurality of software stacks; and
    based on the determined graphics processing usage, process the data for each of the plurality of software stacks separately between the integrated graphics processing unit and the discrete graphics processing unit.

2. The computing system of claim 1, wherein if the hardware virtualizer determines that a first software stack requires a higher graphic processing usage than a second software stack, of the plurality of software stacks, then the hardware virtualizer (i) processes the first software stack using the discrete graphics processing unit, and (ii) processes the second software stack using the integrated graphics processing unit.

3. The computing system of claim 2, further comprising:
  a first frame buffer connected to the integrated graphics processing unit;
  a second frame buffer connected to the discrete graphics processing unit; and a display buffer to receive data from the first frame buffer and the second frame buffer.

4. The computing system of claim 3, wherein the hardware virtualizer (i) prevents the first software stack from accessing the first frame buffer, and (ii) prevents the second software stack from accessing the second frame buffer.

5. The computing system of claim 4, wherein the hardware virtualizer (i) prevents a first portion of the display buffer from being accessed by the second software stack, and (ii) prevents a second portion of the display buffer from being accessed by the first software stack.

6. The computing system of claim 2, wherein the integrated graphics processing unit comprises multiple integrated graphics processing cores and the discrete graphics processing unit comprises multiple discrete graphics processing cores, and wherein the second software stack runs on one or more of the multiple integrated graphics processing cores and the first software stack runs on one or more of the multiple discrete graphics processing cores.

7. The computing system of claim 1, further comprising:
a first display connected to at least one of the discrete graphics processing unit or the integrated graphics processing unit; and
a second display connected to at least one of the discrete graphics processing unit or the integrated graphics processing unit.

8. The computing system of claim 1,
wherein processing the data comprises dynamically switching between the integrated graphics processing unit and the discrete graphics processing unit based on the determined graphics processing usage for each of the plurality of software stacks.

9. A method comprising:
running a hardware virtualizer on a computing system that includes an integrated graphics processing unit and a discrete graphics processing unit, the discrete graphics processing unit having greater processing capabilities as compared to the integrated graphics processing unit;
generating, with the hardware virtualizer, a virtual image of hardware comprised in the computing system;
providing the virtual image to a plurality of software stacks for utilization;
receiving, from each of the plurality of software stacks, data comprising operations performed on the virtual image;
based on the operations performed on the virtual image by each of the plurality of software stacks, determining a graphics processing usage for each of the plurality of software stacks; and
based on the determined graphics processing usage, processing the data for each of the plurality of software stacks separately between the integrated graphics processing unit and the discrete graphics processing unit.

10. The method of claim 9, further comprising:
processing (i) a first one of the plurality of software stacks using the discrete graphics processing unit, and (ii) a second one of the plurality of software stacks using the integrated graphics processing unit based on the first software stack requiring a higher graphics processing usage than the second software stack; and
preventing at least one of (i) the first software stack from communicating with the integrated graphics processing unit, or (ii) the second software stack from communicating with the discrete graphic processing unit.

11. A non-transitory computer readable medium storing instructions that, when executed by a hardware virtualizer of a computing system, cause the hardware virtualizer to:
generate a virtual image of hardware comprised in the computing system;
provide the virtual image to a plurality of software stacks for utilization;
receive, from each of the plurality of software stacks, data comprising operations performed on the virtual image;
based on the operations performed on the virtual image by each of the plurality of software stacks, determine a graphics processing usage for each of the plurality of software stacks; and
based on the determined graphics processing usage, process the data for each of the plurality of software stacks separately between an integrated graphics processing unit and a discrete graphics processing unit of the computing system, the discrete graphics processing unit having greater processing capabilities as compared to the integrated graphics processing unit.

12. The non-transitory computer readable medium of claim 11, wherein the executed instructions cause the one or more processors to process the data by dynamically switching between the integrated graphics processing unit and the discrete graphics processing unit based on the determined graphics processing usage for each of the plurality of software stacks.

13. The non-transitory computer readable medium of claim 11, wherein the executed instructions further cause the hardware virtualizer to:
determine that a first software stack requires a higher graphic processing usage than a second software stack, of the plurality of software stacks;
in response to determining that the first software stack requires a higher graphic processing usage than the second software stack, (i) process the first software stack using the discrete graphics processing unit, and (ii) process the second software stack using the integrated graphics processing unit.

14. The non-transitory computer readable medium of claim 13, wherein the computing system further comprises a first frame buffer connected to the integrated graphics processing unit, a second frame buffer connected to the discrete graphics processing unit, and a display buffer to receive data from the first frame buffer and the second frame buffer.

15. The non-transitory computer readable medium of claim 14, wherein the executed instructions further cause the hardware virtualizer to:
prevent the first software stack from accessing the first frame buffer; and
prevent the second software stack from accessing the second frame buffer.

* * * * *